April 9, 1957 A. BREMER ET AL 2,788,264
APPARATUS FOR TEMPERATURE CONTROL OF CHEMICAL REACTION VESSELS
Filed May 25, 1953 3 Sheets-Sheet 1

Inventors: A. Bremer
E. G. Holzmann
P. R. Hoyt
By: J. H. McCarthy
Their Agent

Inventors: A. Bremer
E. G. Holzmann
P. R. Hoyt
By: J. H. McCarthy
Their Agent

United States Patent Office 2,788,264
Patented Apr. 9, 1957

2,788,264

APPARATUS FOR TEMPERATURE CONTROL OF CHEMICAL REACTION VESSELS

Andrew Bremer, Concord, and Ernest G. Holzmann and Paul R. Hoyt, Berkeley, Calif., assignors to Shell Development Company, Emeryville, Calif., a corporation of Delaware Application May 25, 1953, Serial No. 357,304

6 Claims. (Cl. 23—284)

This invention relates to a method and apparatus for controlling the temperature of a chemical reaction vessel and pertains more particularly to the control of an exothermic reaction in a chemical reaction vessel at a substantially constant temperature by a circulating heat exchange medium, the temperature of which may be varied over a wide range.

Circulation of a liquid heat exchange medium through a coil or jacket or over the external surface of a container or vessel has long been used as a method of controlling the temperature of vessels containing liquids or solutions of solids in liquids, chemical reagents which either absorb or evolve heat in the process of reaction, etc. The problem of controlling the temperature of chemical reactions, however, in which the amount of heat absorbed or evolved varies within wide limits during the course of the reaction, has usually involved the use of large volumes of heat exchange medium entailing considerable expense.

In many chemical reactions, it is absolutely essential that the reaction temperature be controlled within very narrow limits of an order such as ±1° F. For example, polyvinyl chloride may be manufactured by the suspension process of batch polymerization of vinyl chloride in methanol-water solution to produce a granular polymer with good electrical and mechanical properties. The properties are closely related to the molecular weight of the polymer, which, in turn, depends critically on the temperature at which the reaction takes place.

It has been found that best results are obtained in manufacturing polyvinyl chloride when the reaction is carried out at 122° F. Very close control of the temperature is required to produce a polymer with a narrow range of molecular weights. The entire charge for each bath is pumped into a jacketed, glass-lined pressure vessel, and adequate agitation is provided during the reaction so as to minimize temperature differences in various parts of the batch. In order to obtain a product with the desired properties it is necessary to control variations of temperature within the specified limits of ±1° F. of the optimum chosen reaction temperature.

It is, therefore, an object of this invention to provide a temperature control system for controlling automatically the heating and cooling operations of chemical reaction vessels.

A further object of this invention is to provide a temperature control system for chemical reaction vessels, said system comprising a closed circuit for continuously circulating the heat transfer liquid therein and an improved arrangement for selectively heating and/or cooling the fluid in the closed circuit.

Another object of this invention is to provide a temperature control system for chemical reaction vessels for automatically maintaining the temperature in the vessels throughout the reaction at substantially a constant temperature, or within a very narrow temperature range, say, ±1° F. of the desired reaction temperature.

These and other objects of this invention will be understood from the following description taken with reference to the attached drawing, wherein.

Figure 1:
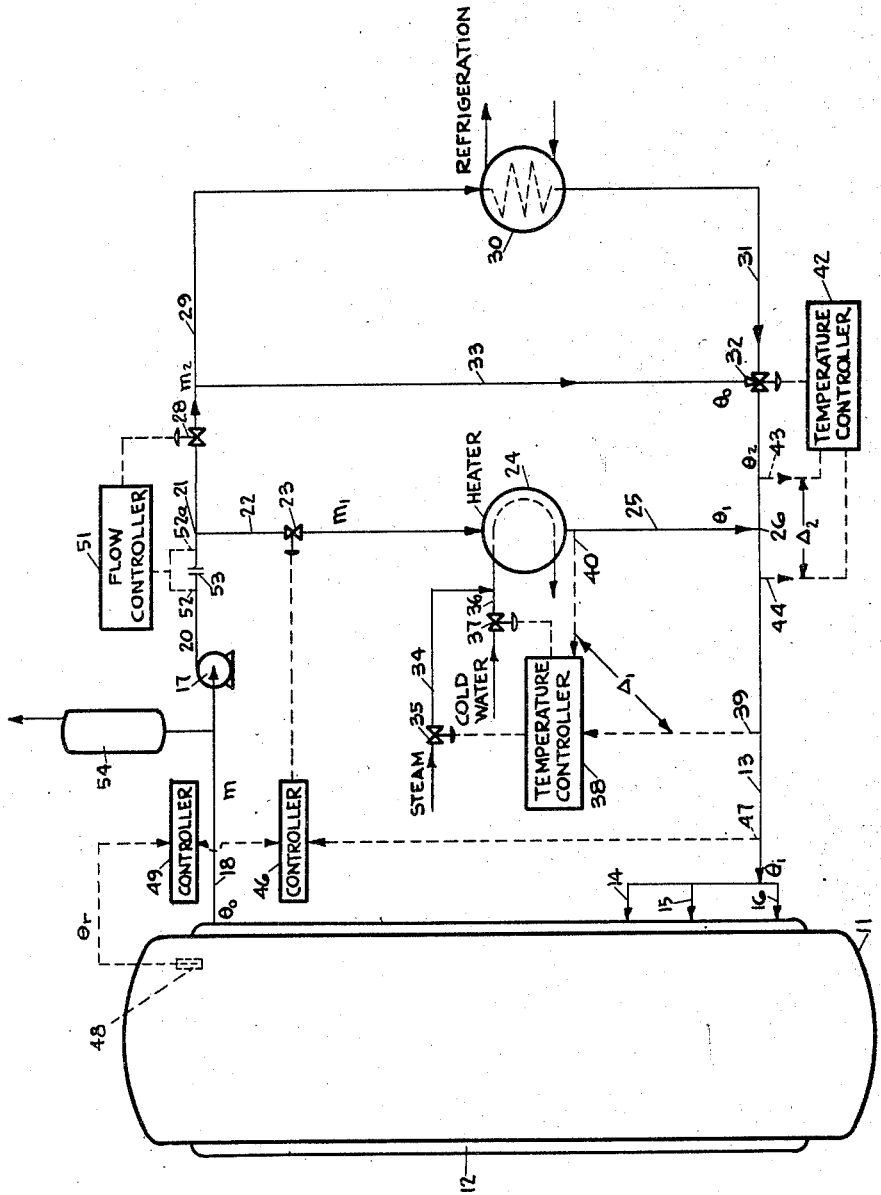
Figures 1 and 2 are schematic flow diagrams showing the arrangement of the principal components of the present system connected to a chemical reaction vessel.

Referring to Figure 1 of the drawing, the proposed temperature control system is illustrated as being mounted adjacent a chemical reactor or reaction vessel 11 surrounded by a water jacket 12 in which cooling water may be circulated from a conduit 13. In order to insure maximum circulation within the jacket 12, the inlet fluid conduit 13 may be provided with a series of injector nozzles diagrammatically represented as 14, 15 and 16.

The intake of a pump 17 for circulating the heat transfer fluid through the present temperature control system is in communication with the discharge conduit 18 from the jacket 12. The discharge conduit 20 from the pump 17 branches at a T-connection 21 to form two loops in the closed circulating system. One loop, the heating loop, comprises conduit 22, valve 23, heater 24, and conduit 25 which connects at point 26 to the inlet conduit 13 leading back to the jacket 12. The second or cooling loop in the system comprises a flow control valve 28, conduit 29, refrigerator unit 30 and conduit 31 which connects with the inlet conduit 13 to the jacket 12 through a three-way valve 32. The cooling loop is also provided with a by-pass conduit 33 which connects conduit 29 through the three-way valve 32 with conduit 13, thus effectively by-passing the refrigerator unit 30.

The circulating stream in the closed system may split at point 21 and recombine at point 26. The mixing point 26 is preferably as close to the inlet of the tank jacket 12 as possible, so as to reduce the residence time of the fluid in conduit 13. For the same reason, the circulating pump 17 and the control valve 28 are installed in the discharge conduit from the jacket rather than in the inlet line to the jacket. The heater 24 is connected by means of a conduit 34 and control valve 35 to a source of steam or other heating medium and by means of conduit 36 and control valve 37 to a source of fluid, such as water. The valves used in the entire system may be of any suitable type which are operated either pneumatically, hydraulically or electrically. The control valves 35 and 37 in the inlet line to the heater 24 are actuated by a temperature controller 38 which has a temperature tap 39 in conduit 13 downstream from the mixing point 26 and a second temperature tap 40 in conduit 25 between the heater 24 and the mixing point 26. The three-way mixing valve 32 in conduit 31 is actuated by a second temperature controller 42 having temperature taps 43 and 44 in conduit 13, respectively, upstream and downstream of the mixing point 26. The controllers 38 and 42 may be differential temperature controllers, for example, the "Dynalog" controller manufactured by the Foxboro Company, and described in their Bulletin No. 427-1, August 1950.

Valve 23 is actuated by a temperature controller 46 which has one temperature tap 47 in conduit 13 at the point where it enters the jacket 12 of the reaction vessel. The temperature controller 46 is also connected to a temperature measuring device, for example, a resistance thermometer 48 built into the reaction vessel 11. Preferably, the sensitive resistance thermometer 48 is connected to a high gain controller 49 which is responsive thereto and transmits an error signal to the temperature controller 46. Alternatively, the temperature measuring device 48 may be of the pressure-bulb type with rate action such as Taylor Instrument Companies' Transaire Temperature Transmitter Model 317RG, p. 10, Bulletin 98097, April 1951. If a unit 48 of this type were employed, the controllers 46 and 49 could be Taylor Tri-Act pneumatic controllers No. 329 RF 111 as shown on page 4 of the same bulletin. In order that a constant flow be maintained through the system, the control valve 28 is connected to a flow controller 51 having pressure taps 52 and 52a upstream and downstream of an orifice 53 positioned in conduit 20 upstream of point 21 where the circulating stream divides. The flow controller 51 may be of any suitable design. For example, it may comprise a differential pressure cell for measuring differential pressure across the orifice 53 together with pneumatic controller such as type M-58 manufactured by Foxboro Company and shown in their Bulletin No. 463, March 1952.

If desired, the system may be provided with a tank or expansion chamber 54 in communication with the suction side of the pump 17 to provide storage as the volume of the heat transfer medium in the system expands or contracts during the reaction cycle and to make up for leakage losses.

Any suitable liquid may be used as the heat exchange medium. Water, alcohol, glycerine, glycol or mixtures thereof, oil, a mixture of diphenyl and diphenyl ether known as Dowtherm, and other similar materials, especially those with high specific heats, are all satisfactory. The most convenient and least expensive medium for temperatures below 100° C., of course, is water and the operation of the present system will be described as using water for the heat exchange medium.

Figure 2:
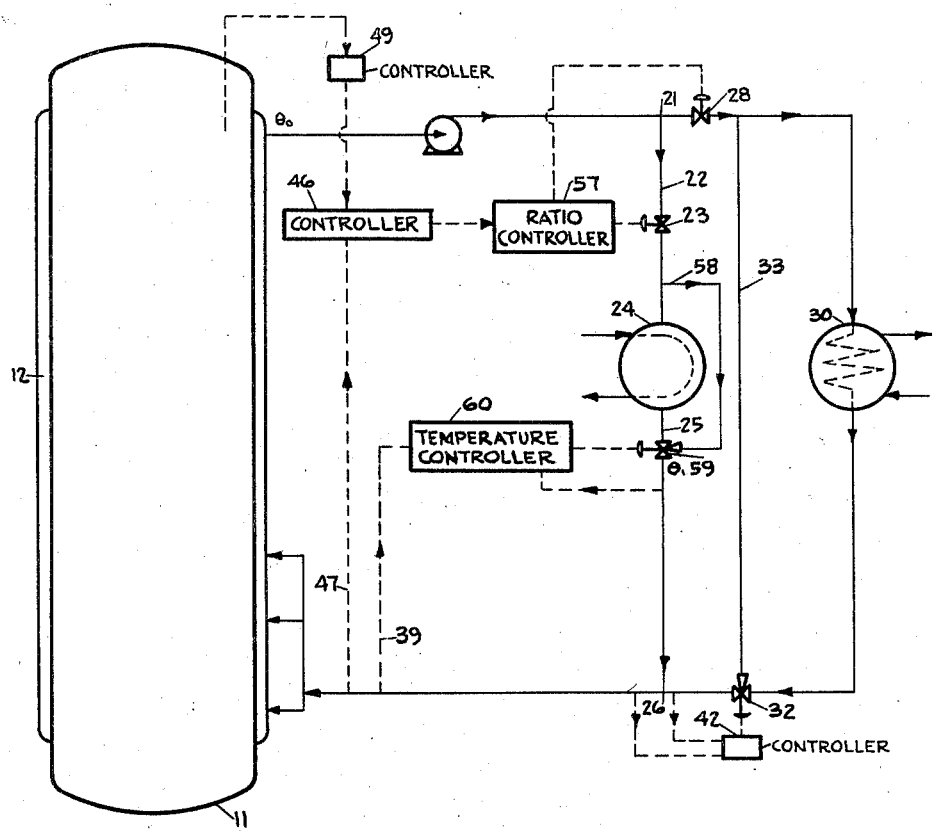

The temperature control system shown in Figure 2 of the drawing differs from that illustrated in Figure 1 in two respects. There are many ways of maintaining a constant flow throughout the system and apportioning the flow between the heating and cooling loops of the system at a certain ratio. In the system illustrated in Figure 2 a ratio controller 57 is inserted in the system to receive signals from the temperature controller 46 and to transmit in response thereto actuating signals to the control valves 23 and 28 to open or close said valves to a greater or lesser degree thereby controlling the ratio of fluid being circulated in the hot and cold loops of the system. Additionally, a by-pass line 58 is provided around the heater 24 and connects with a three-way valve 59 in the conduit line 25 leading from the heater 24. The three-way mixing valve 59 is actuated by a temperature controller 60 which is similar to temperature controller 42 which actuates valve 32 in the cooling loop of the system. Thus, in Figure 2, the heater 24 is maintained at a substantially constant temperature and the temperature of the hot loop stream is controlled by mixing at valve 59 the fluid flowing from the heater 24 through conduit 25 with a flow through by-pass conduit 58.

Figure 3:
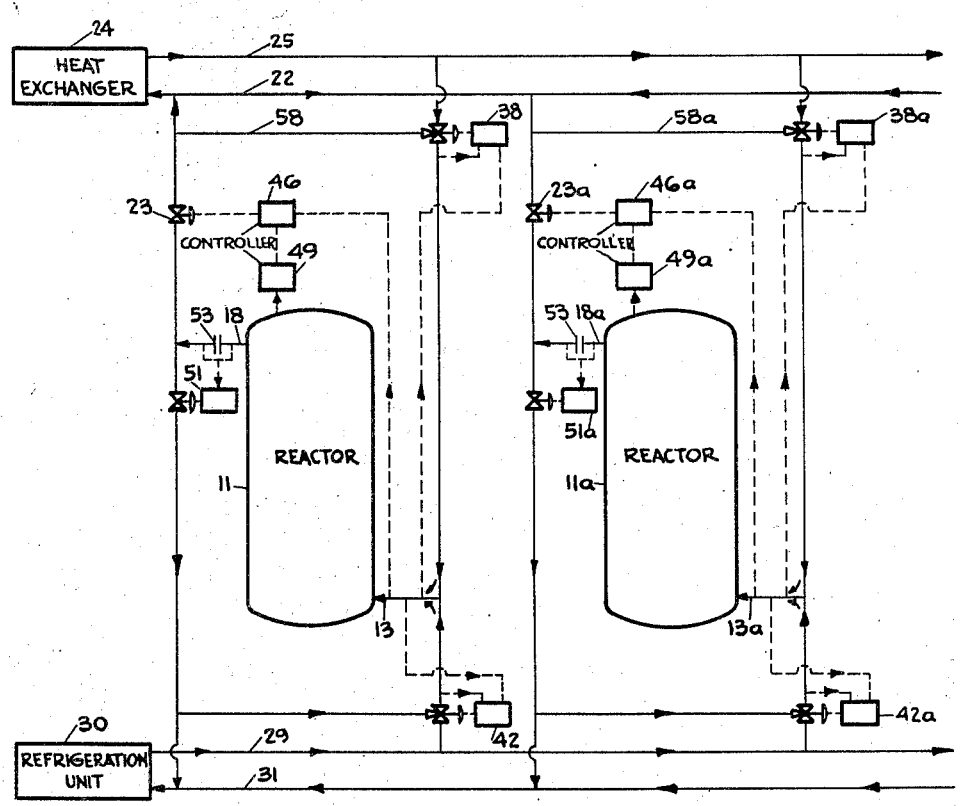
Figure 3 is a schematic flow diagram showing the principal components of the present temperature control system connected to a plurality of chemical reactors such as shown in Figures 1 and 2.

Figure 3 shows a series of temperature control systems (each similar to that illustrated in Figure 1) for several reactors 11 and 11a which are connected in parallel to the same heat exchanger 24 and refrigeration unit 30. It is realized that additional units or reaction vessels may also be connected in parallel to the same heat exchanger and refrigeration unit depending upon the chemical reaction carried out in the reactors and the peak loads required from the heat exchanger and the refrigeration unit. In the manufacture of polyvinyl chloride by the suspension process of batch polymerization of vinyl chloride in methanol-water solution, the individual peak loads of the different reactors 11 and 11a (and others) can be staggered and the designed capacity of the refrigeration unit can be based on the average load rather than on the sum of all the peak loads.

All automatic controllers referred to hereinabove are preferably of commercially available types well known to the art.

In operation, the reaction takes place in the reaction vessel 11 (Figure 1) whose temperature depends, first, upon the heat generated or required by the reaction, and second, on the heat removed or added by the cooling water, since losses through the body of the vessel and to atmosphere may be considered negligible. In order to maintain a constant temperature throughout the reaction, the heat absorbed by the cooling water must be equal to the heat generated by the reaction at every instance. The present system is capable of doing this and satisfies the desired limitation of $\pm 1°$ F. of permissible temperature variation.

The temperature $\theta_i$ of the cooling water entering the jacket 12 is the controlling factor in determining the rate at which heat is transferred through the jacket walls. The heat added to or removed from the cooling water will, in general, cause the jacket outlet temperature $\theta_o$ to be different from the inlet temperature $\theta_i$. The difference of the temperatures $\Delta_o = (\theta_o - \theta_i)$ is kept small by circulating the water at a high flow rate $m$.

Since good control of the temperature within the reaction vessel 11 is achieved only if the jacket inlet water temperature $\theta_i$ can be instantaneously changed to a temperature either higher or lower than the average temperature called for by the reaction rate, the present system provides means for mixing two streams of fluid, one hot $(m_1, \theta_1)$, the other cold $(m_2, \theta_2)$ at a point 26 close to the jacket intake. The steam of fluid coming out of the discharge jacket conduit 18 passes through the pump 17 and conduit 20 to be split at point 21, a portion of the flow $(m_1)$ passing down conduit 22 through the heater 24 while the other portion of the flow $(m_2)$ passes through conduit 29 and refrigerator 30 or through by-pass conduit 33. The ratio of these two streams is controlled by the temperature recorder-controller 46 which actuates control valve 23 to determine the amount of fluid flow through the hot loop of the system, while the control valve 28 is actuated by flow controller 51 to maintain the total flow through the system constant and allow the other portion of the total stream to pass through the cold loop of the system. A flow controller is employed since resistance to the flow of circulating fluid varies in the system depending upon the ratio of the two streams passing through the hot and cold loops of the system. The streams passing through the hot and cold loops of the system mix at point 26, and the mixed stream temperature $\theta_i$ at the jacket inlet is a function of the flow of ratio $m_1/m_2$, and of the hot and cold stream temperatures $\theta_1$ and $\theta_2$.

In order to operate the present system economically with a minimum average load on the refrigeration unit 30, it is desirable that the flows $m_1$ and $m_2$ through the hot and cold loops, respectively, be kept equal. In order to accomplish this it is necessary that the temperatures $\Delta_1 = (\theta_1 - \theta_i)$ and $\Delta_2 = (\theta_i - \theta_2)$ be kept equal. Thus, the temperature difference between the hot stream $\theta_1$ in conduit 25 and the mixed hot and cold stream $\theta_i$ in conduit 13 must equal the temperature difference between the mixed hot and cold stream $\theta_i$ in conduit 13 and the temperature of the cold stream $\theta_2$ in conduit 31. Thus, the present system provides an arrangement whereby a hot and a cold stream coming from conduits 25 and 31 may be mixed at a point 26 with the resulting stream passing through conduit 13 and into the jacket 12 having a temperature half-way between the temperatures of the hot and cold streams when the flow rates of the two streams are equal. For example, if it is desired to operate the reaction at 122° F. and during part of the cycle of the exothermic reaction the temperature of the cooling water entering the jacket 12 through conduit 13 is 70° F., the temperature $\theta_1$ of the water coming from heater 24 is preferably maintained at 73° F. while the temperature of $\theta_2$ coming from the refrigerator unit 30 is kept at 67° F. The two streams would be mixed at point 26 to give a mixed temperature stream $\theta_i$ of 70° as demanded by the temperature controller 46. The temperature controllers 38 and 42 are provided for maintaining the temperatures of the streams coming from the heater and refrigerator loops at any desired temperature, but are preferably set to maintain the temperatures of the two streams the same number of degrees respectively above and below the temperature $\theta_i$ of the mixed stream in conduit 13 after the two streams pass the mixing point 26.

The temperature controller 38 is set to control the temperature of the stream passing through the hot loop at a predetermined number of degrees, say, 3° F., above the temperature entering the jacket 12 from conduit 13. The temperature of the fluid in the two conduits 25 and 13 is sensed by the temperature taps 40 and 39, respectively. If, for example, the indicated temperature between the two points drops below the preset difference of three degrees which is desired, the error signal from the temperature controller 38 will either open or close the control valves 35 and 37 in the steam and cold water lines as needed. Heat will be supplied to the heater 24 to a greater or lesser degree in order to again reestablish a three-degree temperature difference between flow streams in conduits 25 and 13.

In a like manner, the temperature controller 42 acts to maintain the temperature $\theta_2$ of the flow stream in conduit 31 at three degrees below the mixing point 26. While the temperature controller 42 could be used to control the temperature of the refrigeration unit 30 it has been found to be more economical to run the refrigeration unit at a fixed value, putting a portion of the flow passing through the cold loop through the refrigeration unit while the other portion of the flow passing through the cold loop is by-passed through conduit 33 and again mixed with the flow from the refrigeration unit by valve 32 which is controlled by the temperature controller 42. Thus, the temperature controller 42 controls the mixing ratio of the two streams of conduits 31 and 33 to maintain a temperature $\theta_2$ on reaching mixing point 26 which is three degrees below that of the desired temperature in conduit 13.

The mixing ratio of the two streams through the hot and cold loops of the system, which mix at point 26, is controlled by the control valve 23 which is actuated by temperature controller 46. The set point of the temperature controller 46 is made dependent on the reaction rate by the high-gain controller 49 which is actuated from the sensitive resistance thermometer 48 in the vessel 11. A set point in the controller 49 is previously set at the temperature at which it is desired to carry out the reaction in vessel 11. As the reaction rate increases, the temperature $\theta_r$ of the reaction mixture also tends to increase. This error is amplified in controller 49 which transmits a signal to and lowers the set point of temperature controller 46. This change of set point in temperature controller 46 causes it to transmit a signal to actuate valve 23 which decreases the flow ratio $m_1/m_2$ until the jacket intake temperature $\theta_1$ is equal to the new set point of the temperature controller 46. Due to the lowering of the temperature $\theta_1$ of the water entering the jacket 12 of the vessel 11, the temperature controllers 38 and 42 are called upon to lower also the temperatures $\theta_1$ and $\theta_2$ of the hot and cold streams, respectively, in order to restore the differences $\Delta_1$ and $\Delta_2$ to equilibrium. As equilibrium is again approached, the flow ratio $m_1/m_2$ returns to unity.

In Figure 1 the stream of fluid passing through the hot loop of the system is maintained at a temperature $\Delta_1$ above $\theta_1$ by controlling the flow rate and temperature of the heating medium through conduit 34 to heat exchanger 24 so that the desired temperature $\theta_1=(\theta_i+\Delta_1)$ of stream $m_1$ is obtained. The heating medium in one system consists of a mixture of water at 87° F. and low-pressure steam. The control action of temperature controller 38 is sequenced so as to minimize the steam consumption. During those parts of the reaction cycle when the jacket outlet water temperature $\theta_0$ exceeds the desired hot stream temperature $\theta_1$, the heating water flow to the heat exchanger 24 is stopped completely to prevent unnecessary loading of the cooling system.

The same results are obtain by an alternative method as shown in Figure 2 of the drawing. Here the heat exchanger 24 is controlled to produce in conduit 25 a constant high downstream temperature of, say, 130° F. The desired hot stream temperature, $\theta_1$, is obtained by mixing water from the heater 24 with water that has bypassed the heater through conduit 58 and is at the temperature $\theta_0$ of the jacket outlet. The flow ratio of the two streams from the heater 24 and through by-pass line 58 is controlled by valve 59 and temperature controller 60 to maintain a constant temperature difference $$\Delta_1 = (\theta_1 - \theta_i)$$

The design of the heating loop illustrated in Figure 2 has the advantage that it may be readily adapted to parallel operation of a number of similar reaction control systems, employing a common heat exchanger 24 as shown in Figure 3 of the drawing. Normally, a plurality of reaction vessels 11 and 11a would only be connected in parallel when the reaction being carried out therein was of such a character that its time cycle demanded large amounts of heating or cooling capacity for portions of the cycle with no demand for any heating or cooling capacity in other portions of the cycle. Thus, in the batch polymerization of vinyl chloride, which has been considered, at least two reaction vessels 11 and 11a could be mounted in parallel with their operating cycles staggered so that reaction vessel 11 would make a high demand on the refrigeration capacity from unit 30 at the same time that the reaction vessel 11a was making a high demand on the heat exchanger 24. By operating a number of reaction vessels in parallel as shown in Figure 3, a larger amount of polyvinyl chloride may be produced in the reactors without the necessity of installing excessive heating or refrigerating capacity. The various components of the system shown in Figure 3 are identical to, and hence numbered the same as, corresponding units in Figures 1 and 2. The above-described parallel arrangement of a series of reactors having a common heating and refrigeration unit is also desirable where the nature of the product being produced necessitates the removal of a reactor from service every few batches for cleaning purposes.

Thus, it may be seen that the present temperature control system provides a closed system having two loops, a heating loop and a cooling loop, for circulating a heat exchange medium from the cooling jacket of a reaction vessel, and back to the vessel. A portion of the effluent stream from the jacket is cooled to a few degrees below the water temperature being injected into the jacket and the other portion of the stream is heated to a few degrees above the desired temperature of the water entering the jacket, thereby providing means for accurately controlling the temperature of reaction in the vessel at all times and at any desired rate. Without employing a heater or heat exchange unit 24 in the system there is no way to increase the temperature of the reaction vessel at any predetermined rate and the temperature could only be increased by allowing the reaction to run away with itself. Thus, at critical points of the reaction, for example, when it is desired to speed the reaction, or when the temperature starts to diminish for some reason, it becomes necessary to let the temperature go up under its generated heat. Thus, it may be seen that only by employing the present temperature control system is it possible to maintain a reaction temperature within the required limits of say ±1° F. throughout the reaction to obtain a good product.

While in the above description the reaction vessel 11 has been described as having a waterjacket 12, it is realized that other means of cooling the vessel may be employed. Since various means, such as cooling coils within the vessel or sprays outside the vessel, are well known to the art and constitute no part of this invention, they will not be described in further detail here.

We claim as our invention:

1. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel, each of said loops comprising a closed hydraulic circuit, means for heating the heat exchange fluid in one of said loops, means for cooling the heat exchange fluid in another of said loops, means in said conduit means responsive to the temperature in the reaction vessel for controlling the flow ratio in said parallel loops, and control means responsive to the temperature of the fluid in said conduit means for maintaining the fluid circulating in the heating and cooling loops at predetermined temperature values respectively above and below the temperature of the fluid entering the heat exchange means of the vessel.

2. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel which join at a mixing point adjacent said fluid inlet means of the heat exchange means, whereby the fluid streams flowing through said conduit loops are mixed at said mixing point, each of said loops comprising a closed hydraulic circuit, means for heating the heat exchange fluid in one of said loops, means for cooling the heat exchange fluid in another of said loops, valve means in said conduit means for controlling the flow ratio in said parallel loops, controller means responsive to the temperatures of said reaction vessel and of said fluid entering the inlet means of said heat exchange means for actuating said valve means, and control means for maintaining the fluid circulating in the heating and cooling loops at predetermined temperature values respectively above and below the temperature of the fluid entering the heat exchange means of the vessel.

3. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel which join at a mixing point adjacent said fluid inlet means of the heat exchange means, whereby the fluid streams flowing through said conduit loops are mixed at said mixing point, each of said loops comprising a closed hydraulic circuit, heater means in one of said loops for heating the heat exchange fluid, refrigerator means in the other of said loops for cooling the heat exchange fluid, valve means in said conduit means for controlling the flow ratio in said parallel loops, controller means responsive to the temperatures of said reaction vessel and of said fluid entering the inlet means of said heat exchange means for actuating said valve means, by-pass conduit means in said other conduit loop for by-passing said refrigerator means, and control means for maintaining the fluid circulating in the heating and cooling loops at predetermined temperature values respectively above and below the temperature of the fluid entering the heat exchange means of the vessel.

4. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel which join at a mixing point adjacent said fluid inlet means of the heat exchange means, whereby the fluid streams flowing through said conduit loops are mixed at said mixing point, each of said loops comprising a closed hydraulic circuit, heater means for heating the heat exchange fluid in one of said loops, refrigerator means for cooling the heat exchange fluid in the other of said loops, first valve means in said conduit means for controlling the flow ratio in said parallel loops, controller means responsive to the temperatures of said reaction vessel and of said fluid entering the inlet means of said heat exchange means for actuating said first valve means, first temperature controller means responsive to the differential temperature of the flow streams downstream of said heater means and downstream of said mixing point for controlling the temperature of said heater means, by-pass conduit means in said other conduit loop for by-passing said refrigerator means, second valve means in said cooling loop downstream of said refrigerator means for controlling the flow ratio of the streams flowing through and by-passing said refrigerator means, and second temperature controller means responsive to the differential temperature of the flow stream in said cooling loop downstream of said second valve means and downstream of said mixing point for actuating said second valve means, whereby the fluid circulating in the heating and cooling loops is maintained at predetermined temperature values respectively above and below the temperature of the fluid entering the heat exchange means of the vessel.

5. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel which join at a mixing point adjacent said fluid inlet means of the heat exchange means, whereby the fluid streams flowing through said conduit loops are mixed at said mixing point, each of said loops comprising a closed hydraulic circuit, heater means for heating the heat exchange fluid in one of said loops, refrigerator means for cooling the heat exchange fluid in the other of said loops, valve means in said conduit means for controlling the flow ratio in said parallel loops, controller means responsive to the temperatures of said reaction vessel and of said fluid entering the inlet means of said heat exchange means for actuating said valve means, first by-pass conduit means in one of said loops for by-passing said heater means, second by-pass conduit means in said other loop for by-passing said refrigerator means, and control means for maintaining the fluid circulating in the heating and cooling loops at predetermined temperature values respectively above and below the temperature of the fluid entering the heat exchange means of the vessel.

6. A system for carrying out chemical reactions at a substantially constant temperature, said system comprising a reaction vessel, said vessel being provided with heat exchange means having fluid inlet and outlet means, conduit means connected between said inlet and outlet means to form a closed external circuit for circulating heat exchange fluid in said heat exchange means, flow control means in said conduit means for maintaining the flow rate therethrough at a constant value, a pump in said conduit means for forcing a fluid therethrough, said conduit means comprising two conduit loops in parallel which join at a mixing point adjacent said fluid inlet means of the heat exchange means, whereby the fluid streams flowing through said conduit loops are mixed at said mixing point, each of said loops comprising a closed hydraulic circuit, heater means for heating the heat exchange fluid in one of said loops, refrigerator means for cooling the heat exchange fluid in the other of said loops, valve means in said conduit means for controlling the flow ratio in said parallel loops, controller means responsive to the temperatures of said reaction vessel and of said fluid entering the inlet means of said heat exchange means for actuating said valve means, first by-pass conduit means in one of said loops for by-passing said heater means, second by-pass conduit means in said other loop for by-passing said refrigerator means, first control means in said heating loop for controlling the flow ratio of the streams flowing through and by-passing said heater means, and second control means in said cooling loop for controlling the flow ratio of the streams flowing through and by-passing said refrigerator means, whereby the fluid circulating in the heating and cooling loops is maintained at predetermined temperature values respectively above and below the temperature of the fluid entering the heat exchange means of the vessel.

References Cited in the file of this patent

UNITED STATES PATENTS

| | | |
|---|---|---|
| 1,382,569 | Tait | June 21, 1921 |
| 2,104,333 | Rosenblad | Jan. 4, 1938 |
| 2,217,703 | Pew et al. | Oct. 15, 1940 |
| 2,371,381 | Campbell et al. | Mar. 13, 1945 |
| 2,448,538 | Mason | Sept. 7, 1948 |

FOREIGN PATENTS

| | | |
|---|---|---|
| 709,445 | France | Aug. 6, 1931 |